United States Patent
Daoud et al.

[19]

[11] Patent Number: 5,844,785
[45] Date of Patent: Dec. 1, 1998

[54] PROTECTOR DEVICE WITH ISOLATED GROUND CONNECTOR

[75] Inventors: Bassel Hage Daoud, Parsippany; Adam Stuart Kane, Morristown, both of N.J.

[73] Assignee: Lucent Technologies Inc., Murray Hill, N.J.

[21] Appl. No.: 690,663

[22] Filed: Jul. 31, 1996

[51] Int. Cl.⁶ .................................................. H02H 1/04
[52] U.S. Cl. ........................ 361/824; 337/32; 361/119; 361/124; 439/922
[58] Field of Search ........................... 361/641–643, 361/725, 736, 824, 56, 91, 104, 111, 119, 120, 124, 127, 117, 118; 200/51 R; 439/76.1, 214, 620, 639, 652, 680, 922; 174/51; 337/144, 190, 239, 32

[56] References Cited

U.S. PATENT DOCUMENTS

| | | | |
|---|---|---|---|
| 5,157,580 | 10/1992 | Hegner | 361/119 |
| 5,341,269 | 8/1994 | Hayward | 361/119 |
| 5,500,782 | 3/1996 | Oertel | 361/120 |
| 5,596,475 | 1/1997 | Figueiredo | 361/119 |
| 5,606,489 | 2/1997 | Heidorn | 361/824 |
| 5,643,014 | 7/1997 | Filus | 439/680 |

*Primary Examiner*—Gerald P. Tolin

[57] ABSTRACT

Disclosed is a protector device designed for insertion in connecting blocks. The device includes a ground connector which has a detent on one end for receiving a ground bar from the connecting block. The other end of the connector contacts the ground electrode of a voltage surge protector element when the ground bar is inserted without any forces supplied by the housing.

6 Claims, 3 Drawing Sheets

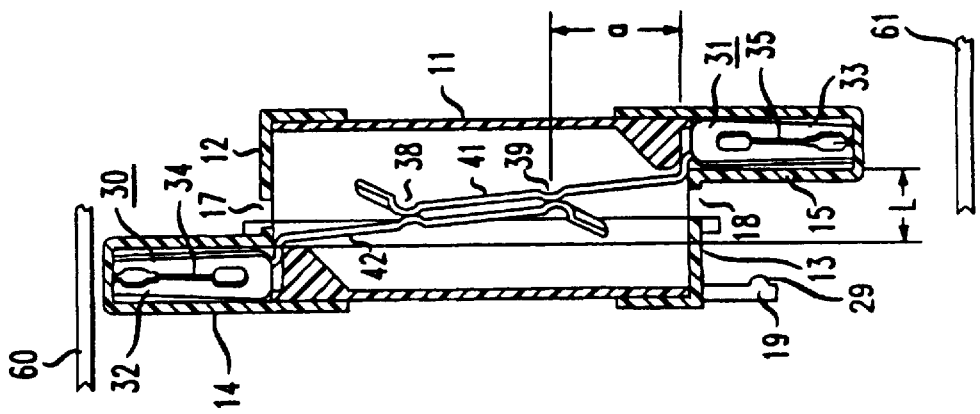

5,844,785

PROTECTOR DEVICE WITH ISOLATED GROUND CONNECTOR

FIELD OF THE INVENTION

This invention relates to current and/or voltage protection devices for inserting into a connecting block.

BACKGROUND OF THE INVENTION

Connecting blocks are used in telecommunications systems for providing electrical connection at central offices and other locations between incoming and outgoing cables and to provide a cross-connection capability. Such connecting blocks normally include voltage and current limiting protection devices to prevent damage to the circuits connected to the blocks. (See, e.g., U.S. Pat. Nos. 4,171,857 and 4,283,103 issued to Forberg et al.)

The protectors usually include a voltage surge protector element, such as a gas tube, current limiting devices such as positive temperature coefficient (PTC) resistors, a ground electrode, and some form of thermal overload protection which short circuits the protector to ground in the event that any heat generated by the protector becomes excessive. The elements are typically mounted on a printed circuit board. (See, e.g., U.S. Pat. No. 5,299,088 issued to Honl et al.) The thermal overload protection is usually triggered by the melting of one or more solder pellets which brings a ground contact into electrical contact with the electrodes of the surge element. (See also U.S. Pat. No. 5,248,953 issued to Honl and U.S. Pat. No. 4,642,723 issued to Achtnig et al.)

Recently, connecting blocks have been proposed with short distances between adjacent contact pairs. (See, e.g., U.S. patent application of Conorich et al, Ser. No. 08/442,862 filed May 17, 1995, now U.S. Pat. No. 5,618,199.) In order to accommodate such short distances, a protector has been proposed which includes a special ground connector which is shaped into a detent on one end for contacting the ground bar of the connecting block and is shaped into an arcuate portion at the other end for contacting the surge protector element. The connector is wedged between the surge protector element and the protector housing. (See, U.S. patent application of Figueiredo et al, Ser. No. 08/497,489, filed Jun. 30, 1995, now U.S. Pat. No. 5,596,475, which is incorporated by reference herein.) While adequate, there may be applications where current through the connector is sufficiently high so as to cause some melting of the housing. If the connector is being supported by a portion of the housing in making contact with the surge protector element, any distortion of that portion caused by melting could result in the connector losing contact with the surge protector element.

It is therefore desirable to provide a protector where the ground connector is more certain to maintain contact with the surge protector element.

SUMMARY OF THE INVENTION

The invention is a protector device adapted for insertion in a connecting block. The protector includes a housing, and a voltage surge protector element mounted within the housing and having a ground electrode. The protector further includes a ground connector comprising an elongated conductive member electrically contacting the ground electrode and having an end portion formed into a detent which is aligned with an opening in the housing so that the end portion is adapted to receive and retain a ground bar on the connecting block. The conductive member is shaped so that forces necessary to keep the member in contact with the surge protector element are not supplied by the housing when the ground bar is received by the detent.

BRIEF DESCRIPTION OF THE FIGURES

These and other features of the invention are delineated in detail in the following description. In the drawing:

FIG. 2 is a cross sectional view of one of the modules of the protector device of FIG. 1 without a protector device inserted therein;

FIG. 3 is a cross sectional view of the same module with a protector device inserted therein;

It will be appreciated that, for purposes of illustration, these figures are not necessarily drawn to scale.

DETAILED DESCRIPTION

Figure 1:
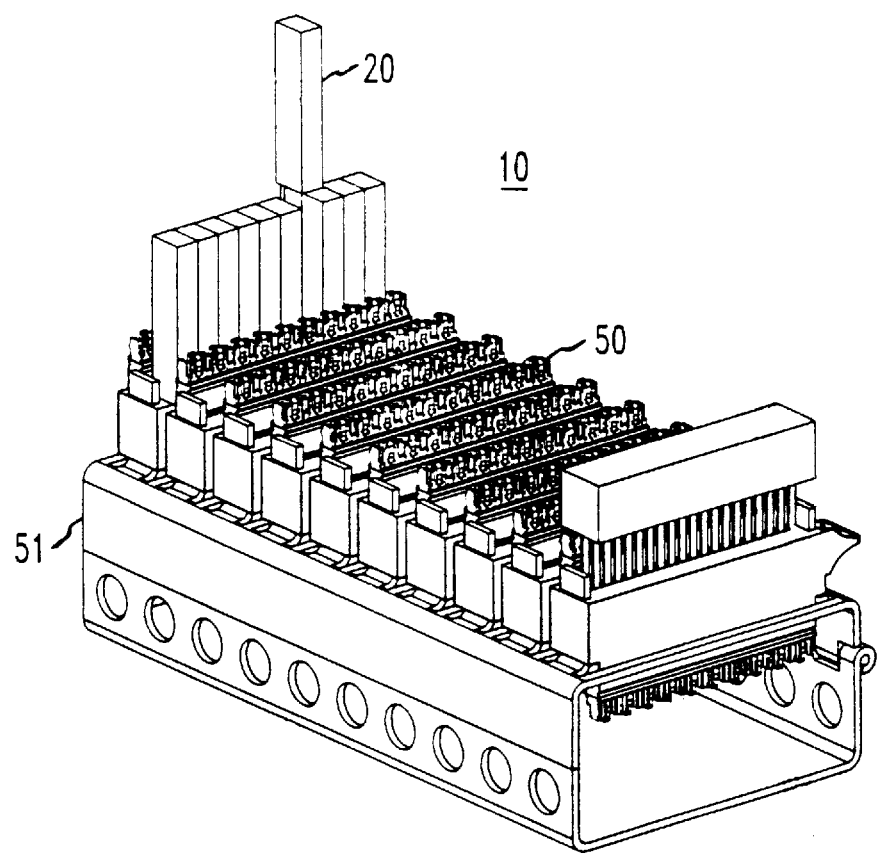
FIG. 1 is a perspective view of a connecting block with a plurality of protector devices inserted therein.

Referring now to the drawings, in which like reference numerals identify similar or identical elements, FIGS. 1 and 2 illustrate one type of connector block, 10, which may utilize the protector devices, e.g., 20, in accordance with the invention. The connector blocks are described in more detail in U.S. patent applications of Baggett et al, Ser. Nos. 08/442,866 and 08/442,863, filed May 17, 1995, now U.S. Pat. Nos. 5,575,689 and 5,549,489, respectively, and Figueiredo et al, Ser. No. 08/442,898, filed May 17, 1995, now U.S. Pat. No. 5,643,014, which are incorporated by reference herein.

The connector block, 10, includes a plurality of connector modules, e.g., 50, which are inserted into a hinged mounting bracket, 51. As illustrated in FIG. 2, each module includes an insulating housing having a rectangular-shaped body portion, 11, with insulating caps, 14 and 15, a portion of which defines a top surface, 12, and bottom surface, 13, respectively. A row of insulation displacement contacts, e.g., 30, extends through the top surface, 12, and a row of insulation displacement contacts, e.g., 31, extends through the bottom surface, 13. Each contact, 30 and 31, includes an end portion, 32 and 33, protruding through the surface, the end portions having an insulation-piercing slit, 34 and 35. Each end portion, 32 and 33, is capable of receiving a wire, 60 and 61, for purposes of providing electrical connection thereto. Each contact also includes a stem portion, 42 and 41, which is housed in the body portion, 11, and makes contact with a corresponding contact in the other row, desirably, at two points, 38 and 39, to electrically connect the wires, 60 and 61, coupled to corresponding contacts, 30 and 31, in the two rows.

The contact points, 38 and 39, are aligned with respective slots, 17 and 18, in the top and bottom surfaces, 12 and 13, to permit insertion of leads from protectors or other elements mounted on the top or bottom surfaces. For example, FIG. 1 shows a row of protector devices, 20, in accordance with the invention mounted to the top surface of the block, while FIG. 3 illustrates a single protector device, 21, mounted to the bottom surface of the block. It will be noted that the protector, 21, is electrically connected to the stem portions of the two contacts, 30 and 31, as well as to the two adjacent contacts (not shown) in the row by means of a lead, 40, which has its two major surfaces insulated from each other so that current is forced to flow through the protector device in the manner illustrated by the arrows. Further, the protector device is electrically coupled to a ground bar, 19 of FIG. 2, on the surface of the block so that excess current and voltage can be diverted to ground.

Figure 4:
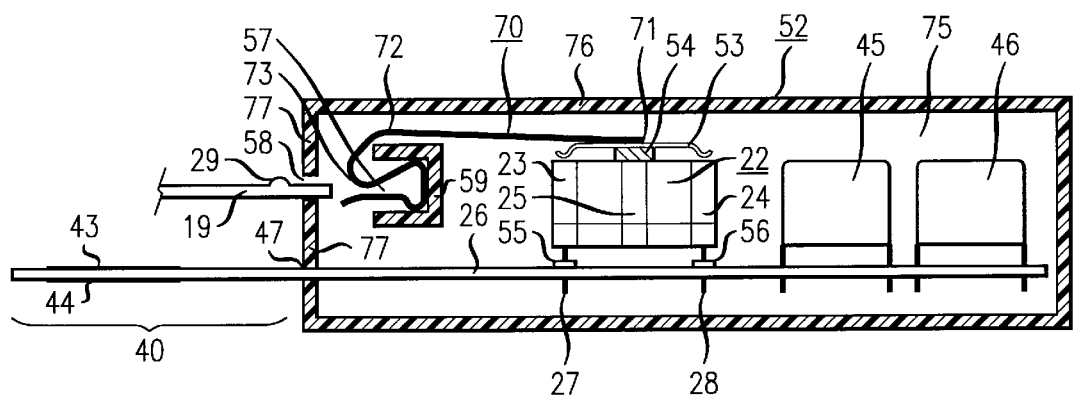
FIG. 4 is a side, cross sectional view of a protector device in accordance with an embodiment of the invention.

As illustrated in FIG. 4, the protector, 21, in accordance with one embodiment includes a voltage surge protector element, 22, such as a standard gas tube suppressor The element, 22, includes a pair of biasing electrodes, 23 and 24, at either end of the tube, and a ground electrode, 25, at the center. The tube is through-hole mounted to a printed circuit board, 26, by soldering pins, 27–28, connected to the biasing electrodes, 23 and 24, respectively. The pins, 27 and 28, connected to the biasing electrodes, 23 and 24, are electrically coupled to conductive pads, 55 and 56, on the circuit board so that the electrodes are electrically coupled to the contact pads, e.g., 43 or 44, on the lead portion, 40, which are on the same surface of the circuit board, 26, as the tube, 22. The ground electrode, 25, however, is electrically isolated from other components or conductive paths on the board.

The voltage surge protector element, 22, is electrically coupled in series to a pair of Positive Temperature Coefficient (PTC) resistors, 45 and 46, which are also through-hole mounted by soldering to the printed circuit board, 26. The surge protector element, 22, and PTC resistors, 45 and 46, are protected by an insulating housing, 52, such as plastic, which encloses those components and a portion of the board, 26. A portion, 40, of the board, 26, previously referred to as the lead portion, protrudes through an opening, 47, in the housing, 52, to permit insertion of said lead portion into the connector block as illustrated in FIG. 3.

Mounted on top of the voltage surge protector element is an essentially flat contact, 53, with its ends bent slightly downward and aligned over the biasing electrodes, 23 and 24. The contact, 53, is in physical and electrical contact with a solder pellet, 54, which is, in turn, in physical and electrical contact with the ground electrode, 25.

In accordance with a key feature of the invention, a ground connector, 70, is provided in the protector housing. The connector is a thin metallic sheet with one end, 71, in physical and electrical contact with the contact, 53. For example, the connector, 70, can be made of beryllium copper alloy with a thickness in the range 0.4 to 0.6 mm with a width which is smaller than the width of the housing, 52. The other end of the sheet is shaped into a detent, 57, which is aligned with an opening, 58, in the housing, 52, so that when the lead, 40, is inserted into the connector block as shown in FIG. 3, the detent, 57, will receive and hold the ground bar, 19 of FIG. 2, with a "clicking" noise so that the craftsperson knows the protector device is fully inserted. Preferably, the detent, 57, includes a hole (not shown) therein which receives a dimple, 29, on the ground bar, 19 to secure the ground bar in the detent. The detent can be held in place prior to insertion of the ground bar by an essentially C-shaped projection, 59, which is attached to or integral with the back surface, 75, of the housing, 52.

During normal operation, current will be conducted in the direction illustrated in FIG. 3 with the surge protector element, 22, being non- conductive. Excess current will be prevented by the changing resistance of the PTC resistors in accordance with known techniques. When the voltage appearing on the biasing electrodes, 23 and 24, reaches a threshold value, the tube, 22, will conduct current to the ground electrode 25, through the contact 53, and the connector, 70, to the ground bar, 19, of the connecting block so that protection from voltage surges is provided. It will be appreciated that in the usual protector device, excess voltage would be shunted through a ground pin. However, by providing the ground path through connector 70 instead, the circuit board, 26, can be made narrower (typically 6 mm) so that the device can fit within the connecting module, 50, having very narrow spaces between adjacent contacts.

Further, in the event of thermal overload, the pellet, 54, will melt, thereby bringing the ends of the contact, 53, into electrical contact with the biasing electrodes 23 and 24. Since the contact, 53, is coupled to ground through the connector, 70, the entire device would be short circuited, preventing any thermal damage to the circuits coupled to the connector block. Since the connector, 70, acts to prevent both excess voltage and thermal overload, again, the protector device can be made smaller.

One of the primary distinctions between the ground connector, 70, and that disclosed in Application of Figueiredo, previously cited, is that the connector of Figueiredo utilizes the top surface, 76, of the housing to provide the downward force necessary to keep the connector, 70, in contact with the surge protector element, 22. In accordance with a key feature of the present invention, the connector, 70, is essentially free to float within the housing and is kept in position by the C-shaped projection, 59, until the ground bar, 19 is inserted into the detent. Once inserted, the ground bar, 19, contacts the bottom of the detent, 57, causing it to rotate in a clockwise direction. The presence of pivot points, 72 and 73, in the connector, 70, positions the end, 71, so that it contacts the contact 53 without physically contacting either the top, 76, or side, 77, surfaces of the housing, 52. Thus, the forces necessary to maintain contact with the surge protector element, 22, are supplied by the connector, 70 and by the ground bar without, any contribution from the housing, 52.

The invention claimed is:

1. A protector device adapted for insertion in a connecting block comprising:

an insulative housing defined by a plurality of exterior walls and having an opening through a first of said walls and a generally C-shaped projection extending into the interior of said housing from a second of said walls, said C-shaped projection being open to said first wall and aligned with said opening, said opening adapted to receive therethrough a ground bar of the connecting block;

a voltage surge protector element mounted within the housing and having a ground electrode; and a ground connector within said housing and comprising an elongated conductive member having a first end electrically contacting the ground electrode and having an end portion remote from said first end formed into a detent which is supported in said C-shaped projection so as to be aligned with said opening, the end portion being adapted to receive and retain therein said ground bar of the connecting block inserted through said opening, the conductive member being shaped between said end portion and said first end as a generally straight line so that the entire conductive member is isolated from all of said exterior walls of said housing and the conductive member is self-biased so that it supplies force necessary to contact the ground electrode without physically contacting the exterior walls of the housing both when the detent is supported in the C-shaped projection and when the ground bar is received and retained by the detent.

2. The device according to claim 1 wherein the conductive element comprises a first pivot point for providing vertical adjustment of the member when the ground bar is received.

3. The device according to claim 2 wherein the conductive member further includes a second pivot point for providing a vertical adjustment of the member.

4. The device according to claim 1 wherein the connector electrically contacts the ground electrode through another contact mounted on a pellet which is mounted on the ground electrode.

5. The device according to claim 4 wherein the voltage surge protector element includes a pair of biasing electrodes and the contact includes ends aligned with the biasing electrodes so that when the pellet melts, the contact and ground connector make electrical contact with the biasing electrodes.

6. The device according to claim 1 wherein the voltage surge protector element is mounted on a printed circuit board.

\* \* \* \* \*